(12) United States Patent
McCullough et al.

(10) Patent No.: US 8,941,025 B2
(45) Date of Patent: Jan. 27, 2015

(54) PLUME SHROUD FOR LAMINAR PLASMA GUNS

(75) Inventors: Richard McCullough, Brooklyn, NY (US); Mark F. Spaulding, Northport, NY (US); Robert F. Savill, Jr., Levittown, NY (US); Ronald J. Molz, Mt. Kisco, NY (US)

(73) Assignee: Oerlikon Metco (US) Inc., Westbury, NY (US)

( * ) Notice: Subject to any disclaimer, the term of this patent is extended or adjusted under 35 U.S.C. 154(b) by 0 days.

(21) Appl. No.: 13/575,240

(22) PCT Filed: Jan. 25, 2011

(86) PCT No.: PCT/US2011/022449
§ 371 (c)(1),
(2), (4) Date: Jul. 25, 2012

(87) PCT Pub. No.: WO2011/094224
PCT Pub. Date: Aug. 4, 2011

(65) Prior Publication Data
US 2012/0298217 A1 Nov. 29, 2012

Related U.S. Application Data

(60) Provisional application No. 61/298,366, filed on Jan. 26, 2010.

(51) Int. Cl.
| | |
|---|---|
| *B23K 9/02* | (2006.01) |
| *B05D 3/00* | (2006.01) |
| *B05D 1/02* | (2006.01) |
| *H05H 1/26* | (2006.01) |
| *B05B 15/00* | (2006.01) |
| *B05B 1/28* | (2006.01) |

(Continued)

(52) U.S. Cl.
CPC ............. *B23K 10/027* (2013.01); *B23K 9/32* (2013.01); *H05H 1/34* (2013.01); *H05H 2001/3457* (2013.01)
USPC ............ 219/121.47; 219/121.48; 219/121.36; 219/121.37; 219/121.39; 219/121.45; 219/121.5; 219/121.51; 219/121.52; 427/189; 427/422; 427/446; 239/289; 239/291; 239/430; 239/433; 239/436; 239/498; 239/526; 239/586; 239/518; 239/571; 228/9; 228/45; 156/158; 156/294; 156/359; 156/366; 156/499; 156/579

(58) Field of Classification Search
USPC ............ 219/121.47, 121.48, 121.36, 121.37, 219/121.39, 121.45, 121.51, 121.52; 427/189, 422, 446; 239/289, 291, 430, 239/433, 436, 498, 526, 586, 518, 571; 228/9, 45; 156/158, 294, 359, 366, 156/423, 499, 579
See application file for complete search history.

(56) References Cited

U.S. PATENT DOCUMENTS 3,217,133 A * 11/1965 Mattmuller ....................... 219/75
3,235,705 A * 2/1966 Agnew et al. .................. 219/126

(Continued)

*Primary Examiner* — Dana Ross
*Assistant Examiner* — Gyounghyun Bae
(74) *Attorney, Agent, or Firm* — Greenblum & Bernstein, P.L.C.

(57) ABSTRACT

Plume shield shroud (10) for a plasma gun (30) includes a substantially tubular member (14) comprising an axial length, a plume entry end (11), and a plume exit end (13). The shroud (10) is adapted to be mounted to a plasma gun (30). A method of protecting, confining or shielding of a gas plume of a plasma gun (30) includes mounting (20) a gas plume shroud (10) on the plasma gun (30) such that the shroud (10) is sized and configured to substantially surround at least a portion of the gas plume.

19 Claims, 5 Drawing Sheets

(51) Int. Cl.
  *B05B 7/06* (2006.01)
  *B05B 7/04* (2006.01)
  *A62C 31/00* (2006.01)
  *B05B 7/02* (2006.01)
  *B05B 1/30* (2006.01)
  *B23Q 15/00* (2006.01)
  *B23K 10/02* (2006.01)
  *B23K 9/32* (2006.01)
  *H05H 1/34* (2006.01)

(56) References Cited

U.S. PATENT DOCUMENTS

| | | | |
|---|---|---|---|
| 3,312,810 A * | 4/1967 | Neumeier | 219/98 |
| 3,888,422 A | 6/1975 | Robinson | |
| 4,415,795 A * | 11/1983 | Ross et al. | 219/121.44 |
| 4,707,585 A * | 11/1987 | Monteith et al. | 219/121.79 |
| 4,714,513 A * | 12/1987 | McAlister | 156/359 |
| 4,714,860 A * | 12/1987 | Brown et al. | 315/111.81 |
| 4,780,591 A * | 10/1988 | Bernecki et al. | 219/121.52 |
| 4,869,936 A * | 9/1989 | Moskowitz et al. | 427/455 |
| 5,019,429 A * | 5/1991 | Moskowitz et al. | 427/422 |
| 5,084,603 A * | 1/1992 | Bernuchon et al. | 219/74 |
| 5,285,967 A * | 2/1994 | Weidman | 239/80 |
| 5,403,399 A * | 4/1995 | Kurihara et al. | 118/723 DC |
| 5,519,183 A * | 5/1996 | Mueller | 219/121.52 |
| 5,579,983 A * | 12/1996 | Mogi | 228/45 |
| 5,624,586 A * | 4/1997 | Sobr et al. | 219/121.48 |
| 6,149,112 A * | 11/2000 | Thieltges | 248/178.1 |
| 6,706,993 B1 * | 3/2004 | Chancey et al. | 219/121.47 |
| 6,811,812 B2 * | 11/2004 | Van Steenkiste | 427/189 |
| 7,375,301 B1 * | 5/2008 | Noujaim | 219/121.47 |
| 7,557,324 B2 * | 7/2009 | Nylen et al. | 219/121.47 |
| 7,582,846 B2 * | 9/2009 | Molz et al. | 219/121.47 |
| 7,644,872 B2 * | 1/2010 | Lang et al. | 239/84 |
| 8,162,239 B2 * | 4/2012 | Hursen | 239/571 |
| 2003/0052095 A1 * | 3/2003 | Sanders et al. | 219/121.39 |
| 2004/0195213 A1 * | 10/2004 | Angel | 219/86.25 |
| 2005/0048218 A1 * | 3/2005 | Weidman | 427/446 |
| 2006/0289404 A1 | 12/2006 | Hawley et al. | |
| 2007/0138147 A1 * | 6/2007 | Molz et al. | 219/121.47 |
| 2007/0284340 A1 * | 12/2007 | Jorgensen | 219/121.5 |
| 2009/0039059 A1 * | 2/2009 | Twarog et al. | 219/121.44 |
| 2009/0071944 A1 * | 3/2009 | Forlong | 219/121.39 |
| 2009/0314202 A1 * | 12/2009 | Zajchowski et al. | 118/620 |
| 2010/0096368 A1 * | 4/2010 | Blankenship et al. | 219/121.47 |
| 2010/0200549 A1 * | 8/2010 | Blankenship et al. | 219/121.47 |
| 2012/0220138 A1 * | 8/2012 | Van Gerwen et al. | 438/791 |

* cited by examiner

PLUME SHROUD FOR LAMINAR PLASMA GUNS

CROSS-REFERENCE TO RELATED APPLICATIONS

The instant application is an International Application based on U.S. provisional application No. 61/298,366, filed Jan. 26, 2010, the disclosure of which is hereby expressly incorporated by reference hereto in its entirety.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

Plasma spray is perhaps the most flexible of all of the thermal spray processes as it can develop sufficient energy to melt any material. Plasma spray guns use powder as the coating feedstock, and the number of coating materials that can be used in the plasma spray process is almost unlimited. In a plasma spray gun, a high frequency arc is ignited between an anode (nozzle) and a cathode (electrode). Process gases, generally mixtures of argon, nitrogen, hydrogen and helium, flowing between the anode and the cathode is ionized to become a plume of hot plasma gas, reaching temperatures of 6,600° C. to 16,600° C. (12,000° F. to 30,000° F.). When the coating feedstock material is injected into the gas plume, it is melted and propelled towards a target substrate.

The plasma plumes produced by atmospheric thermal spray guns that are laminar are sensitive to the surrounding environment. These plumes can be easily disrupted by air currents. As the thermal spray gun is moved or traversed over a substrate, air currents impinge upon the plume. Compounding this is the need to have a forced flow of air through a spray booth during operation of the plasma gun. Disturbing the plasma plume can cause several undesirable effects.

In a first undesirable effect, the plume can be shifted in a direction relative to powder injection resulting in poor energy transfer to the powder particles and subsequent poor coating results.

In another undesirable effect, the laminar tube of the plume can collapse and result in increased interaction with the environment. Laminar plumes are considered very effective for spraying as the energy is contained within the laminar tube and thus transfers more heat energy to the powder particles.

In another undesirable effect of extreme cases, for example with the external arc plumes, the arc position can be affected resulting in damage to the cathode, anode, and/or the surrounding components from misplaced arc energy.

Accordingly, what is needed is an apparatus that protects a laminar plasma plume from being disturbed from the ambient air currents and/or which overcome one or more of the above-noted deficiencies.

BRIEF SUMMARY OF THE INVENTION

In accordance with a non-limiting aspect of the invention there is provided a plume shield shroud comprising a substantially tubular or cylindrical member having an axial length, a plume entry end, and a plume exit end, wherein said shroud is adapted to be mounted to a plasma gun.

In embodiments, the substantially cylindrical member comprises a perforated metal member.

In embodiments, the substantially tubular or cylindrical member comprises at least one of a side opening adapted to receive therein a member of the plasma gun and a side opening allowing powder to be injected into a gas plume.

In embodiments, the substantially tubular or cylindrical member comprises a mounting member for mounting the shroud to the plasma gun.

In embodiments, the substantially tubular or cylindrical member comprises a mounting member for mounting the shroud to a mounting assembly.

In embodiments, the mounting assembly is structured and arranged to mount said shroud to the plasma gun.

In embodiments, the plume shroud further comprises a mounting assembly for mounting the shroud to the plasma gun.

In embodiments, the plume shroud further comprises a mounting assembly for movably mounting the shroud to the plasma gun.

In embodiments, the shroud is at least one of movably mounted to the plasma gun, pivotally mounted to the plasma gun, and removably mounted to the plasma gun.

In embodiments, the axial length is at least one of greater than a diameter of the substantially cylindrical member and sized to shield a gas plume starting approximately at a point where the gas plume leaves the plasma gun to a predetermined distance past a location of powder injection into the gas plume.

According to another non-limiting aspect of the invention, there is provided a plasma gun plume shield shroud comprising a member sized and configured to substantially surround at least a portion of a gas plume, wherein the member is sized and configured to prevent at least partial disruption of the gas plume by an air current.

In embodiments, the member is at least one of a substantially cylindrical member and a perforated metal member.

In embodiments, the member comprises at least one of a side opening adapted to receive therein a member of a plasma gun and a side opening allowing powder to be injected into the gas plume.

In embodiments, the member comprises at least one of a mounting member for mounting the shroud to a plasma gun and a mounting member for mounting the shroud to a mounting assembly.

In embodiments, the shroud further comprises a mounting assembly structured and arranged to mount said shroud to a plasma gun.

In embodiments, the shroud is at least one of movably mounted to a plasma gun, pivotally mounted to a plasma gun, and removably attached to a plasma gun.

According to another non-limiting aspect of the invention, there is provided a method of protecting, confining or shielding a gas plume of a plasma gun, wherein the method comprises mounting a gas plume shroud in an area of the gas plume, wherein the shroud sized and configured to substantially surround at least a portion of the gas plume.

In embodiments, the gas plume shroud is at least one of a substantially cylindrical member and a perforated metal member.

In embodiments, the gas plume shroud comprises a side opening adapted to receive therein a portion of the plasma gun.

In embodiments, the mounting comprises at least one of movably mounting the gas plume shroud to the plasma gun, removably movably mounting the gas plume shroud to the plasma gun, and pivotally mounting the gas plume shroud to the plasma gun.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted drawings by way of a non-limiting example embodiment of the present invention, and wherein.

DETAILED DESCRIPTION OF THE INVENTION

Figure 1:
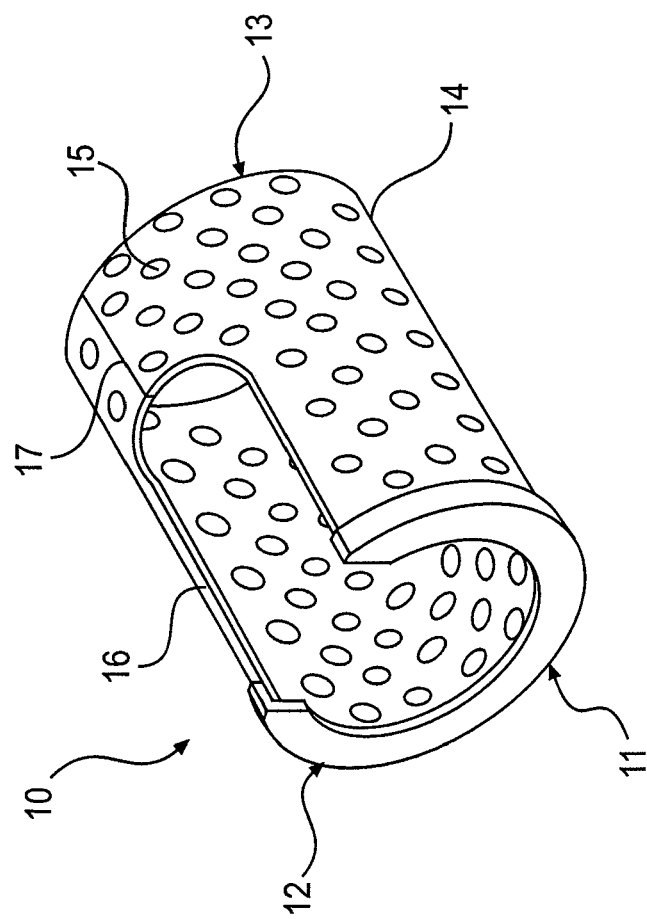
FIG. 1 is a perspective view of an embodiment of the plume shield shroud.
Figure 2:
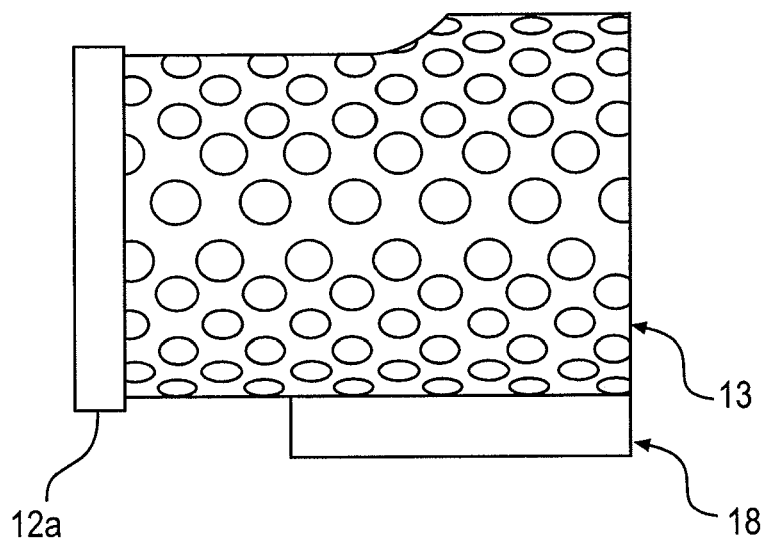
FIG. 2 is a side planar view of the shroud shown in FIG. 1.
Figure 3:
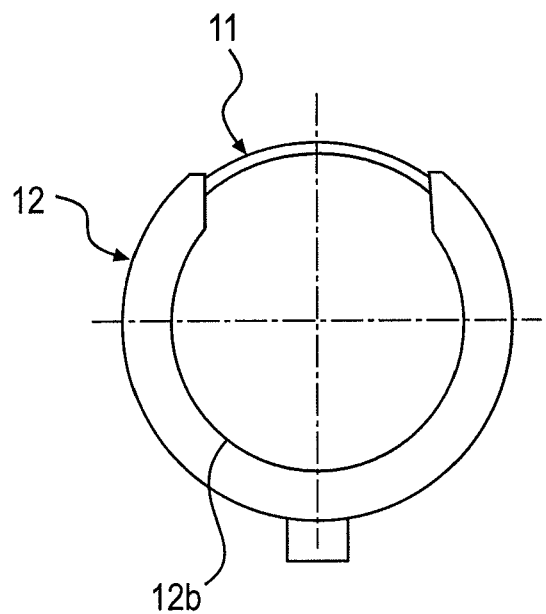
FIG. 3 is a first end view of the shroud shown in FIG. 1.
Figure 4:
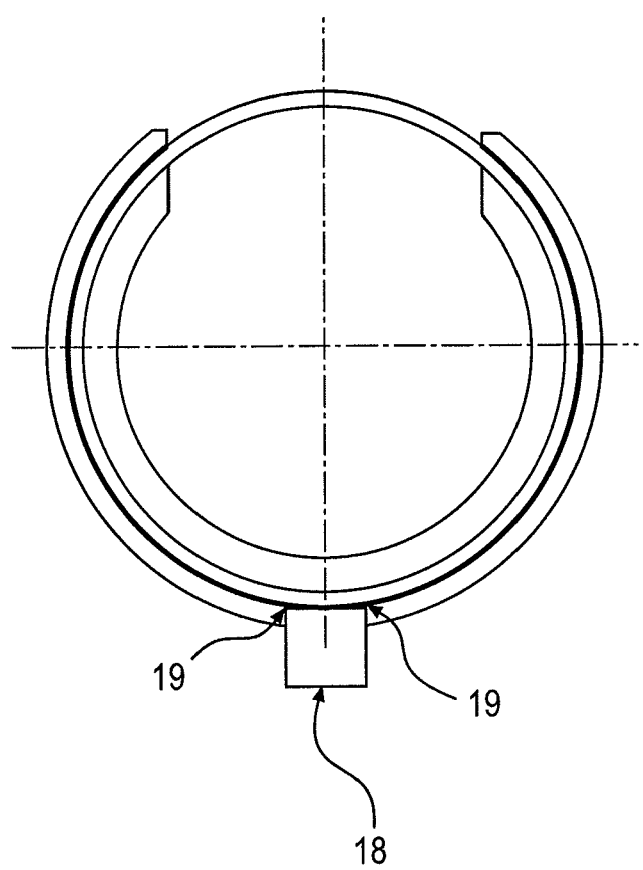
FIG. 4 is a second end view of the shroud shown in FIG. 1.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Development of laminar plasma plumes in atmospheric thermal spray applications is relatively recent, and the problems with adverse effects to these plumes is a new revelation. Laminar plasma plumes have existed for some time in low pressure and reactor chambers, however the problems with ambient gas was not encountered in these situations.

One aspect of the invention relates to a shroud for the laminar plasma plume. This shroud minimizes any potential forced interaction with air currents. The air currents might be caused, for example, by exhaust flow or gun motion. The shroud shields the plume starting approximately at the point the plume leaves the gun body to a predetermined distance past the location of powder injection into the plume. In a preferred embodiment, this distance is approximately one third the spray distance. In another embodiment, this distance is one half the spray distance. In still another embodiment, this distance is approximately one third to approximately one half the spray distance.

In an embodiment, the shroud is arranged as generally cylindrical. The length of the generally cylindrical shroud is similar to the lengths discussed above as the length of the shroud. The diameter of the generally cylindrical shroud is suitable to protect the plume. In an embodiment, the diameter of the generally cylindrical shroud is approximately 7 cm to approximately 10 cm.

In another embodiment, the shroud is made of any suitable material. For example, in an embodiment, the shroud is made of a metal, more preferably a high temperature metal that can withstand the heat of the plasma plume. Non-limiting examples of such materials are described below.

In another embodiment, the shroud is made of an open frame or perforated metal. This allows the plume to be viewed through the shroud. The shroud may have approximately one third to one half of the surface area open with holes. The holes or openings may range from approximately 15 mm to approximately 50 mm in diameter. Larger holes may also be used but with reduced effectiveness. Use of a metal or wire mesh may also be used.

In another embodiment, the shroud has a thermal barrier material or coating applied to the inside facing surface, i.e., the surface surrounding the gas plume. This thermal barrier contains the radiated heat and improves the thermal efficiency of the process.

In another embodiment, the shroud is mountable on a plasma gun. Additionally, the shroud, when mounted on a plasma gun, may also be pivotal and/or rotatable to allow full view of the plume or plume area when the gun is not in motion. This allows, for example, the taking of diagnostic measurements that would otherwise be blocked or interfered with by the shroud.

In another embodiment, the shroud may use a two-layer shroud. For example, an outer layer having a finer inner mesh inner layer. This multi-layer shroud may be used for additional resistance to penetration by air currents. In embodiments, an outer layer of the shroud is a perforated member and an inner layer of the shroud is a metal or wire mesh. In embodiments, an outer layer of the shroud is a wire or metal mesh and an inner layer of the shroud is a perforated member. In embodiments, both the outer and inner layers of the shroud are a perforated member. In embodiments, both the outer and inner layers of the shroud are a metal or wire mesh.

Figure 5:
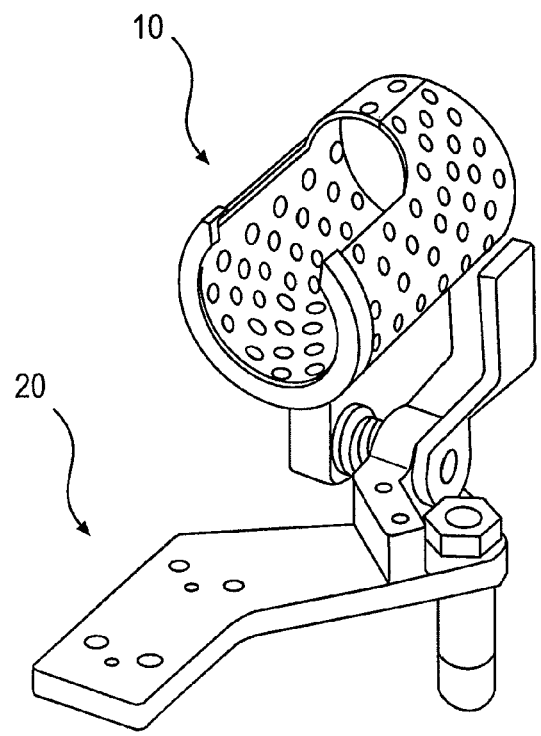
FIG. 5 is a top rear side perspective view of the plume shield shroud mounted to a mounting assembly.
Figure 6:
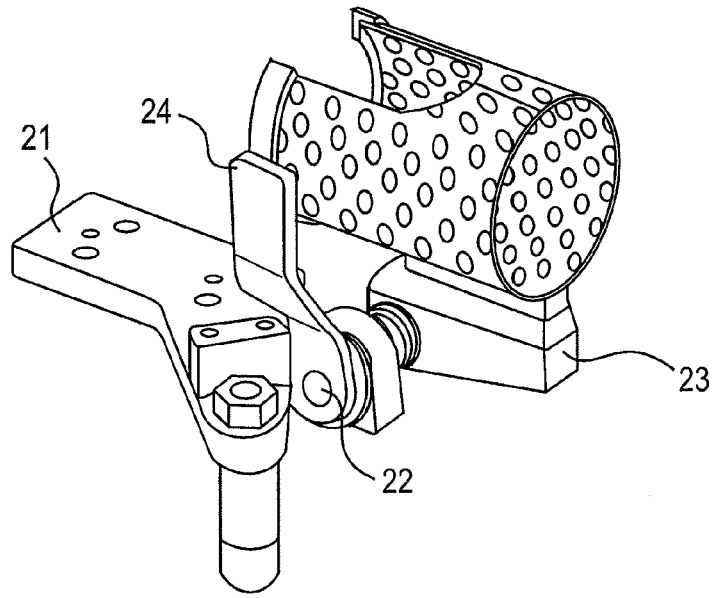
FIG. 6 is a top front side perspective view of the plume shield shroud and mounting assembly of FIG. 5.
Figure 7:
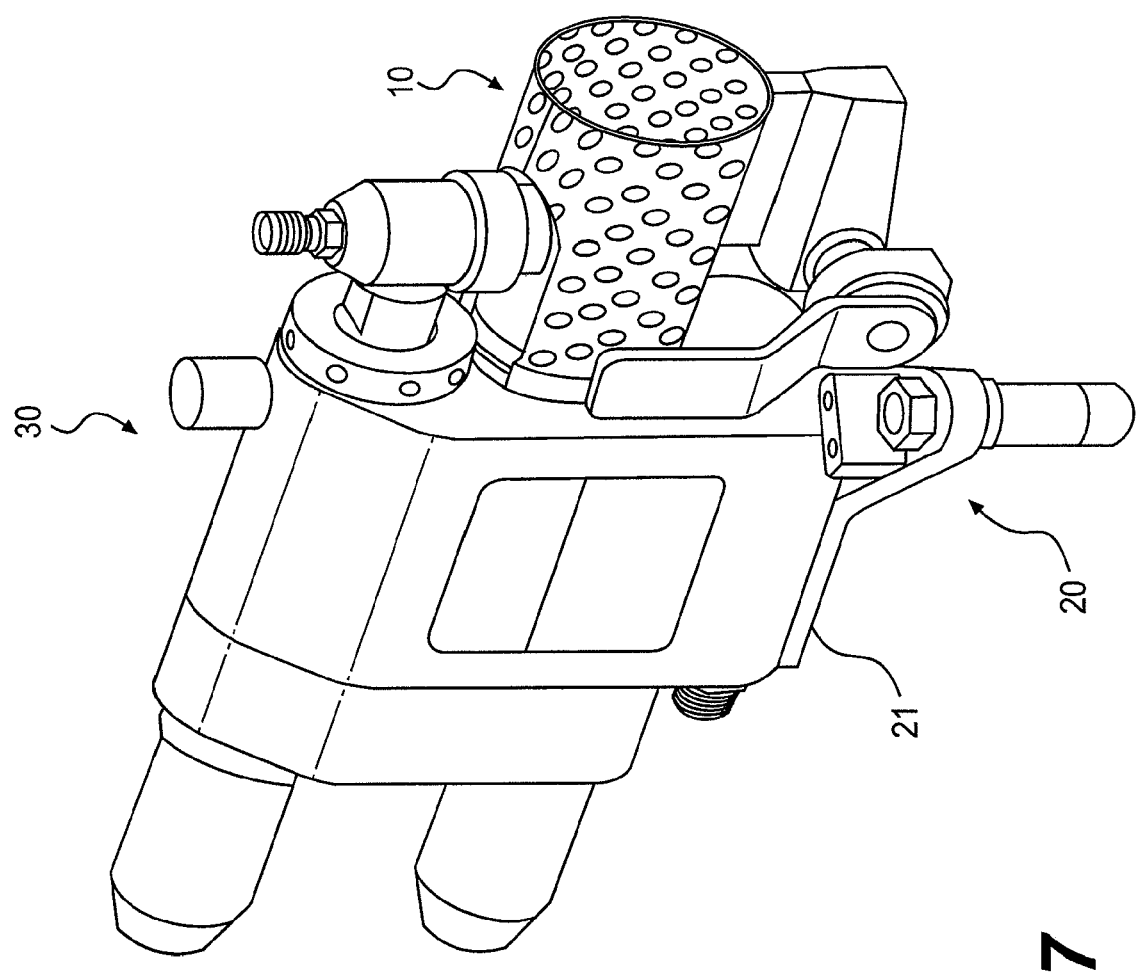
FIG. 7 is a top and right side perspective view of a plume shield shroud and mounting assembly attached to a plasma gun.

Referring now to the figures which show non-limiting aspects of the invention, there is shown in FIGS. 1-4 a shroud 10 in accordance with the invention, while FIGS. 5 and 6 show a non-limiting mounting assembly 20 to which the shroud 10 can be mounted and FIG. 7 shows a non-limiting way in which the assembly 10/20 can be mounted to a plasma gun 30.

FIGS. 1-4 show details of the plume shield shroud 10 in accordance with the invention. The shroud 10 has a first end 11 and a second end 13. The first end 11 is open and includes a shroud ring member 12 secured thereto. In embodiments, the ring 12 is secured to the first end 11 via welding. Other joining techniques may also be utilized. The ring 12 has an annular portion whose inner edge 12b is sized to be smaller than an inside diameter of a main section 14 of the shroud 10 and a circumferential portion 12a sized and configured to receive therein or slide over the first end 11. The section or main body 14 is made of an open frame or a perforated metal. In accordance with a non-limiting embodiment, the outside diameter of the generally cylindrical body 14 is between approximately 7 cm and approximately 10 cm.

The body 14 is a tubular member and can be made of any suitable material. In embodiments, the body 14 is made of a metal and more preferably a high temperature metal that can withstand the heat of a plasma plume. The body 14 material may be or include any of the following materials; steel; stainless steel; copper; inconel; high temperature nickel, chromium and/or cobalt based alloys; other metal families and alloys that can withstand tempts of up to 1500 degrees C. or more. Ceramics may also be used, for example, aluminum oxide. In embodiments, the body 14 utilizes or includes a thermal barrier material or coating applied to the inside facing surface, i.e., the surface surrounding the gas plume.

In embodiments, the body 14 is perforated with the perforations 15 being of any size and/or shape. As described above, in embodiments, the holes or openings 15 may range from approximately 15 mm to approximately 50 mm in diameter. The shape may be, for example, circular, partially circular, polygons, partially polygonal, irregular in shape, as well as any shape that includes curved or linear sections or mixtures thereof. Additionally, artistic designs may be incorporated in the perforations and/or may result from their particular arrangement. In embodiments, the void to solid ratio of the body 14 may be between about 5% and about 90%.

In embodiments, the body 14 is formed of a bent perforated sheet metal member which is bent into a generally tubular shape and which includes a main opening 16 which is sized and configured to receive therein a portion of the plasma gun such as a powder injection member. The opening 16 allows the shroud 10 to pivot into and out of the gas plume shielding position shown in FIG. 7. A seam 17 (which can be connected by, e.g., welding) is utilized to join ends of the bent member so that section or body 14 retains its tubular shape. In order to facilitate mounting the shroud 10 to a plasma gun, the shroud 10 includes a mounting bar 18 which is fixed or secured to the body 14 via connections 19. In embodiments, the connections 19 are formed by welding. Member 18 (as well as member 12) can be made of the same or similar materials as those used in making the body 14.

While a cylindrical shape of the shroud 10 is preferred, other tubular shapes may be used, for example, generally oval in cross section, square or rectangular in cross section, as well as having triangular cross section, n-sided polygonal cross section, irregular cross section, a clover leaf cross section, and the like.

In embodiments, the body 14 may also be a weave of metal strands or metal fibers (not shown). Such a woven shroud 10 may have a predetermined void to solid ratio of between about 5% to about 75%. This mesh may be regular or irregular or combinations thereof.

Referring now to FIGS. 5 and 6, there is shown a non-limiting mounting assembly 20 to which the shroud 10 can be mounted. In this regard, the mounting assembly 20 includes a mounting plate 21 which includes plural mounting openings and which can be mounted to a plasma gun 30 using, e.g., fasteners such as screw fasteners. Other mechanisms may also be utilized whether they allow for a non-removable mounting or a removable mounting. The mounting assembly 20 also includes a mounting member 23 which includes plural mounting openings and which can be connected to the mounting bar 18 using, e.g., fasteners such as screw fasteners. Other mechanisms may also be utilized whether they allow for a non-removable mounting or a removable mounting. The mounting assembly 20 additionally includes a pivoting shaft 22 which connects the mounting member 23 to a lever 24 which can be moved by a user from a use position, i.e., shown in FIG. 7, to a downward position wherein the shroud 10 no longer surrounds the gas plume (not shown) or a gas plume area. In embodiments, an arrangement is utilized to non-movably retain the shroud 10 in each of these two positions. Such an arrangement can include the spring shown in FIGS. 5 and 6. In embodiments, members 21-24 can be made of the same or similar materials as those used in making the member 18.

FIG. 7 illustrates an embodiment for mounting the mounting assembly 20, and thereby the shroud 10, to a plasma gun 30. In this regard, the mounting assembly 20 is secured to a bottom surface of the plasma gun 30 so that the shroud 10 can assume the use position shown in FIG. 7 when a central axis of the shroud 10 is oriented generally parallel to the bottom surface. In this position, a majority of the gas plume (not shown) is confined within the shroud 10. Moreover, when a user desires to move the shroud 10 out of the use position, the lever 24 (see FIGS. 5 and 6) can be moved downwards to cause the shroud 10 to rotate about an axis of shaft 22 so as to move to a position that does not surround the gas plume. This movement can occur while the powder injector (which in the use position shown in FIG. 7 has a portion extending through opening 16 and into a space within body 14) remains stationary. The advantage of this arrangement is that it allows the plasma gun 30 to be used without the shroud 10 (if desired) and also allows for servicing, replacing or changing-out of the shroud 10.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and sprit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A plume shield shroud comprising:
   a substantially tubular member comprising an open or perforated frame having an axial length, an axially oriented wall opening, a plume entry end, and a plume exit end, and
   a mounting bar structured and arranged to mount said shroud to a plasma gun,
   wherein the axially oriented wall opening is structured to receive a portion of the plasma gun or a portion of a powder injector of the plasma gun.

2. The plume shield shroud of claim 1, wherein the substantially tubular member comprises at least one of:
   a wire mesh member;
   a perforated metal member; and
   a substantially cylindrical member.

3. The plume shield shroud of claim 1, wherein the mounting bar is structured for mounting the shroud to a mounting assembly.

4. The plume shield shroud of claim 3, wherein the mounting assembly is structured and arranged to mount said shroud to the plasma gun.

5. The plume shield shroud of claim 1, further comprising a mounting assembly for mounting the shroud to the plasma gun.

6. The plume shield shroud of claim 1, further comprising a mounting assembly for movably mounting the shroud to the plasma gun.

7. The plume shield shroud of claim 1, wherein the shroud is at least one of:
   movably mountable to the plasma gun;
   pivotally mountable to the plasma gun; and
   removably mountable to the plasma gun.

8. The plume shield shroud of claim 1, wherein the axial length is at least one of:
   greater than a diameter of the substantially cylindrical member; and sized to shield a gas plume starting approximately at a point where the gas plume leaves the plasma gun to a predetermined distance past a location of powder injection into the gas plume.

9. The plume shield shroud of claim 1, further comprising a partial ring surrounding an end of the tubular member.

10. The plume shield shroud of claim 9, wherein the partial ring has an opening corresponding to a width of the axial wall opening.

11. A plasma gun plume shield shroud comprising:
an open or perforated frame member being sized and configured to substantially surround at least a portion of a gas plume and including an opening in a wall of the frame member extending in the direction of the gas plume;
a mounting bar structured and arranged to be mount the open or perforated frame member to a plasma gun,
wherein the open or perforated frame member is sized and configured to prevent at least partial disruption of the gas plume by an air current and the opening in the wall being structured to receive a part of the plasma gun or a part of a powder injector of the plasma gun.

12. The plume shield shroud of claim 11, wherein the member comprises at least one of:
the mounting bar being mountable directly to the plasma gun; and
the mounting bar being mountable to a mounting assembly of the plasma gun.

13. The plume shield shroud of claim 11, further comprising a mounting assembly structured and arranged to mount the mounting bar of said shroud to the plasma gun.

14. The plume shield shroud of claim 11, wherein the shroud is at least one of:
movably mountable to a plasma gun;
pivotally mountable to a plasma gun; and
removably attachable to a plasma gun.

15. The plume shield shroud of claim 11, further comprising a partial ring surrounding an end of the frame member.

16. The plume shield shroud of claim 15, wherein the partial ring has an opening corresponding to a width of the opening in the wall.

17. A method of protecting, confining or shielding a gas plume of a plasma gun, the method comprising:
mounting the mounting bar of the plume shield shroud in accordance with claim 1 to the plasma gun in an area of the gas plume,
wherein the shroud sized and configured to substantially surround at least one of:
a portion of the gas plume; and
a portion of the area of the gas plume.

18. The method of claim 17, further comprising moving the gas plume shroud from at least a first position substantially surrounding at least a portion of the gas plume to at least a second position different from the first position, wherein the moving occurs relative to at least one of:
a surface of plasma gun;
a stationary plasma gun body;
at least one stationary powder injector of the plasma gun; and
a portion of at least one powder injector arranged within the gas plume shroud when the gas plume shroud is in the first position.

19. The method of claim 17, wherein the mounting comprises at least one of:
movably mounting the gas plume shroud to the plasma gun;
removably movably mounting the gas plume shroud to the plasma gun; and
pivotally mounting the gas plume shroud to the plasma gun.

* * * * *